US011803236B2

(12) United States Patent
Li

(10) Patent No.: US 11,803,236 B2
(45) Date of Patent: Oct. 31, 2023

(54) MIRROR AND DISPLAY METHOD

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 441 days.

(21) Appl. No.: 17/043,469

(22) PCT Filed: Apr. 29, 2020

(86) PCT No.: PCT/CN2020/087731
§ 371 (c)(1),
(2) Date: Sep. 29, 2020

(87) PCT Pub. No.: WO2020/238544
PCT Pub. Date: Dec. 3, 2020

(65) Prior Publication Data
US 2022/0326765 A1 Oct. 13, 2022

(30) Foreign Application Priority Data
May 24, 2019 (CN) .......................... 201910440631.8

(51) Int. Cl.
*G06F 3/01* (2006.01)
*G06T 7/50* (2017.01)
(Continued)

(52) U.S. Cl.
CPC .............. *G06F 3/013* (2013.01); *A47G 1/02* (2013.01); *G06F 3/017* (2013.01); *G06F 3/167* (2013.01);
(Continued)

(58) Field of Classification Search
CPC .... G06T 3/40; G06T 7/70; G06T 7/50; G06T 2207/10016; G06T 2207/30201;
(Continued)

(56) References Cited

U.S. PATENT DOCUMENTS 10,475,309 B1\* 11/2019 Cheng ................. G06V 40/172
2013/0286047 A1\* 10/2013 Katano ................... G06T 11/00
348/333.01
(Continued)

FOREIGN PATENT DOCUMENTS

CN 102197918 A 9/2011
CN 103516985 A 1/2014
(Continued)

OTHER PUBLICATIONS

First Office Action dated Jan. 22, 2021, relating to CN Patent Application No. 201910440631.8.

*Primary Examiner* — Doon Y Chow
*Assistant Examiner* — Dennis Chow
(74) *Attorney, Agent, or Firm* — DINSMORE & SHOHL LLP

(57) ABSTRACT

A mirror comprises a mirror surface, a display device, an imaging and distance measuring device and a processor; the imaging and distance measuring device is used to acquire a first user image stream, detect a distance between a user and the mirror surface; the processor is configured to determine, from the first user image stream and the distance, a coordinate of a target position at which the user is gazing in a preset coordinate system, and to zoom in the first user image stream, with a position corresponding to the position coordinate in the first user image stream as the center, and to obtain a second user image stream; the display device is configured to display at least a portion of a central region of the second user image stream; the central region is centered
(Continued)

on a location corresponding to the position coordinates in the second user image stream.

18 Claims, 6 Drawing Sheets

(51) Int. Cl.
| | |
|---|---|
| *G06T 7/70* | (2017.01) |
| *G06V 40/18* | (2022.01) |
| *G06V 40/20* | (2022.01) |
| *A47G 1/02* | (2006.01) |
| *G06F 3/16* | (2006.01) |
| *G06T 3/40* | (2006.01) |
| *A47G 1/00* | (2006.01) |

(52) U.S. Cl.
CPC .................. *G06T 3/40* (2013.01); *G06T 7/50* (2017.01); *G06T 7/70* (2017.01); *G06V 40/18* (2022.01); *G06V 40/20* (2022.01); *A47G 2001/002* (2013.01); *G06T 2207/10016* (2013.01); *G06T 2207/30201* (2013.01)

(58) Field of Classification Search
CPC .......... G06V 40/20; G06V 40/18; A47G 1/02; A47G 2001/002; G06F 3/013; G06F 3/167; G06F 3/017
See application file for complete search history.

(56) References Cited

U.S. PATENT DOCUMENTS

| | | |
|---|---|---|
| 2014/0160163 A1 | 6/2014 | Zhang et al. |
| 2015/0062089 A1 | 3/2015 | Howard |
| 2019/0004600 A1 | 1/2019 | Wu et al. |
| 2019/0220661 A1 | 7/2019 | Wang et al. |

FOREIGN PATENT DOCUMENTS

| | | |
|---|---|---|
| CN | 103873840 A | 6/2014 |
| CN | 106896999 A | 6/2017 |
| CN | 107272904 A | 10/2017 |
| CN | 107797664 A | 3/2018 |
| CN | 108227163 A | 6/2018 |
| CN | 108257091 A | 7/2018 |
| CN | 109313291 A | 2/2019 |
| CN | 110109553 A | 8/2019 |
| WO | 2013118205 A1 | 8/2013 |
| WO | 2017108702 A1 | 6/2017 |
| WO | 2018004615 A1 | 1/2018 |

* cited by examiner

MIRROR AND DISPLAY METHOD

CROSS-REFERENCE TO RELATED APPLICATIONS

This application is a U.S. National Stage under 35 U.S.C. § 371 of International Application No. PCT/CN2020/087731 filed on Apr. 29, 2020, which claims priority to Chinese patent application No. 201910440631.8 filed on May 24, 2019, and the contents disclosed in any of these applications are incorporated herein by reference in their entirety.

TECHNICAL FIELD

The present disclosure relates to a mirror and a display method.

BACKGROUND

Nowadays, a mirror is an indispensable item in every home, and people can view their clothes, hairstyles, makeup and so on through the mirror so as to adjust their appearances as needed. However, while dressing, clothing matching and the like, users put more demands on the mirror.

SUMMARY

The present disclosure discloses a mirror comprising a mirror surface and a display device arranged on a back surface of the mirror surface, and the mirror further comprises an imaging and distance measuring device and a processor; the mirror surface comprises a transflective area, and the display device is arranged in the transflective area; the processor is separately connected with the display device and the imaging and distance measuring device;
  the imaging and distance measuring device is configured to acquire a first user image stream, detect a distance between a user and the mirror surface, and output the first user image stream and the distance to the processor;
  the processor is configured to determine, from the first user image stream and the distance, a position coordinate of a target position at which the user is gazing in a preset coordinate system, the preset coordinate system being located in association with a body of a user, and the processor is further configured to zoom in the first user image stream, with a position corresponding to the position coordinate in the first user image stream as the center, to obtain a second user image stream, and to output the second user image stream to the display device;
  the display device is configured to display at least a portion of a central region of the second user image stream; the central region is centered on a location corresponding to the position coordinates in the second user image stream.

Alternatively, the processor is configured to extract, from the first user image stream, a first image of the user looking straight at the mirror surface and a second image of the user gazing at a target position, and to determine from the first image, the second image and the distance the position coordinate of the target position in the preset coordinate system.

Alternatively, the transflective area comprises a first transflective film layer and a first transparent substrate arranged in a stack; a surface of the first transparent substrate away from the first transflective film layer is a part of the back surface of the mirror surface.

Alternatively, the mirror surface further comprises a light blocking area comprising a second transflective film layer, a second transparent substrate, and a light blocking layer, which are disposed in a stack; and the surface of the light blocking layer away from the second transparent substrate is a part of the back surface of the mirror surface.

Alternatively, a reflectivity of the first transflective film layer is greater than or equal to 60% and less than or equal to 80%. Alternatively, a reflectivity of the second transflective film layer is greater than or equal to 60% and less than or equal to 80%.

Alternatively, the mirror further comprises an action recognition device, the action recognition device being provided in the transflective area on the back surface of the mirror surface;
  the action recognition device is configured to identify a user action instruction, and output the user action instruction to the processor;
  the processor is further configured to zoom in or zoom out the second user image stream according to the user action instruction, with a position corresponding to the position coordinates in the second user image stream as the center, and output the zoomed-in or zoomed-out second user image stream to the display device;
  the display device is further configured to display the second user image stream after zooming in or zooming out.

Alternatively, the mirror further comprises a voice recognition device configured to identify a user voice instruction, and output the user voice instruction to the processor;
  the processor is further configured to zoom in or zoom out the second user image stream according to the user voice instruction, with a position corresponding to the position coordinates in the second user image stream as the center, and output the zoomed-in or zoomed-out second user image stream to the display device;
  the display device is further configured to display the second user image stream after zooming in or zooming out.

Alternatively, the imaging and distance measuring device comprises a camera and a distance measuring module; or the imaging and distance measuring device comprises a binocular camera.

The present disclosure also discloses a display method applied to the above mirror, comprising:
  acquiring a first user image stream, and detecting a distance between a user and a mirror surface;
  determining, from the first user image stream and the distance, position coordinates of a target position at which the user is gazing in a preset coordinate system, the preset coordinate system being located in association with the user's body;
  zooming in the first user image stream with a position corresponding to the position coordinate in the first user image stream as a center, and obtaining a second user image stream;
  displaying at least a portion of a central region of the second user image stream, the central region being centered on a location corresponding to the position coordinates in the second user image stream.

Alternatively, the determining, from the first user image stream and the distance, position coordinates of the target location at which the user is gazing in a preset coordinate system comprises:

extracting, from the first user image stream, a first image of the user looking straight at the mirror surface and a second image of the user gazing at a target position; and determining the position coordinates of the target position in the preset coordinate system based on the first image, the second image and the distance.

Alternatively, the determining position coordinates of the target location in a preset coordinate system based on the first image, the second image, and the distance comprises:

identifying a first center of a left-eye pupil and a first center of a right-eye pupil in the first image;

identifying a second center of the left-eye pupil or a second center of the right-eye pupil in the second image;

determining a position abscissa of the target position in the preset coordinate system based on a first angle, a distance between the first center of the left-eye pupil and the first center of the right-eye pupil in a preset horizontal direction, and the distance, wherein the first angle is a deflection angle between the first center of the left-eye pupil and the second center of the left-eye pupil in the preset horizontal direction, or, a deflection angle between the first center of the right-eye pupil and the second center of the right-eye pupil in the preset horizontal direction;

determining a position ordinate of the target position in the preset coordinate system based on a second angle and the distance, wherein the second angle is a deflection angle between the first center of the left-eye pupil and the second center of the left-eye pupil in a preset vertical direction, or, a deflection angle between the first center of the right-eye pupil and the second center of the right-eye pupil in the preset vertical direction;

wherein an origin of the preset coordinate system is a central position between the first center of the left-eye pupil and the first center of the right-eye pupil; and the preset vertical direction is perpendicular to the preset horizontal direction.

Alternatively, the first angle is the deflection angle between the first and second center of the left-eye pupils in the preset horizontal direction;

the determining the position abscissa of the target position in the preset coordinate system based on the first angle, the distance between the first center of the left-eye pupil and the first center of the right-eye pupil in the preset horizontal direction, and the distance, including:

determining the position abscissa of the target position in the preset coordinate system by a following formula (1) based on the first angle, the distance between the first center of the left-eye pupil and the first center of the right-eye pupil in the preset horizontal direction, and the distance:

$$x = 2d \cdot \tan \theta_1 - p/2 \qquad (1)$$

wherein x represents the position abscissa, d represents the distance between the user and the mirror surface, $\theta_1$ represents the first angle, and p represents the distance between the first center of the left-eye pupil and the first center of the right-eye pupil in the preset horizontal direction.

Alternatively, the first angle is the deflection angle between the first center of the right-eye pupil and the second center of the right-eye pupil in the preset horizontal direction;

the determining a position abscissa of the target position in a preset coordinate system based on the first angle, the distance between the first center of the left-eye pupil and the first center of the right-eye pupil in the preset horizontal direction, and the distance, including:

determining the position abscissa of the target position in a preset coordinate system by a following formula (2) based on the first angle, the distance between the first center of the left-eye pupil and the first center of the right-eye pupil in the preset horizontal direction, and the distance:

$$x = 2d \cdot \tan \theta_2 + p/2 \qquad (2)$$

wherein x represents the position abscissa, d represents the distance between the user and the mirror surface, $\theta_2$ represents the first angle, and p represents the distance between the first center of the left-eye pupil and the first center of the right-eye pupil in the preset horizontal direction.

Alternatively, the determining a position ordinate of the target position in the preset coordinate system from the second angle and the distance comprises:

determining the position ordinate of the target position in the preset coordinate system based on the second angle and the distance by the following formula (3):

$$y = 2d \cdot \tan \beta \qquad (3)$$

wherein y represents the position ordinate, d represents the distance between the user and the mirror surface, and d represents the second angle.

Alternatively, the zooming in the first user image stream with a position corresponding to the position coordinate in the first user image stream as a center, and obtaining a second user image stream comprises:

determining a magnification factor based on the distance;

zooming in the first user image stream according to the magnification factor, with the position corresponding to the position coordinate in the first user image stream as a center, to obtain a second user image stream.

Alternatively, after displaying a central region of the second user image stream, the method further comprises:

identifying a user action instruction or a voice instruction;

zooming in or zooming out the second user image stream according to the user action instruction, with a position corresponding to the position coordinate in the second user image stream as a center;

displaying the second user image stream after being zoomed-in or zoomed-out.

According to another aspect of the present disclosure, it is provided a non-transitory computer readable medium having instructions stored thereon, which, when executed by a processor, cause the processor to perform the steps of the above method.

According to another aspect of the present disclosure, it is provided a computer program product comprising instructions which, when executed by a processor, cause the processor to carry out the steps of the above method.

DETAILED DESCRIPTION

In order to make the above objectives, features and advantages of the present disclosure more obvious and understandable, the present disclosure will be further described in detail below in conjunction with the accompanying drawings and specific embodiments.

Figure 1:
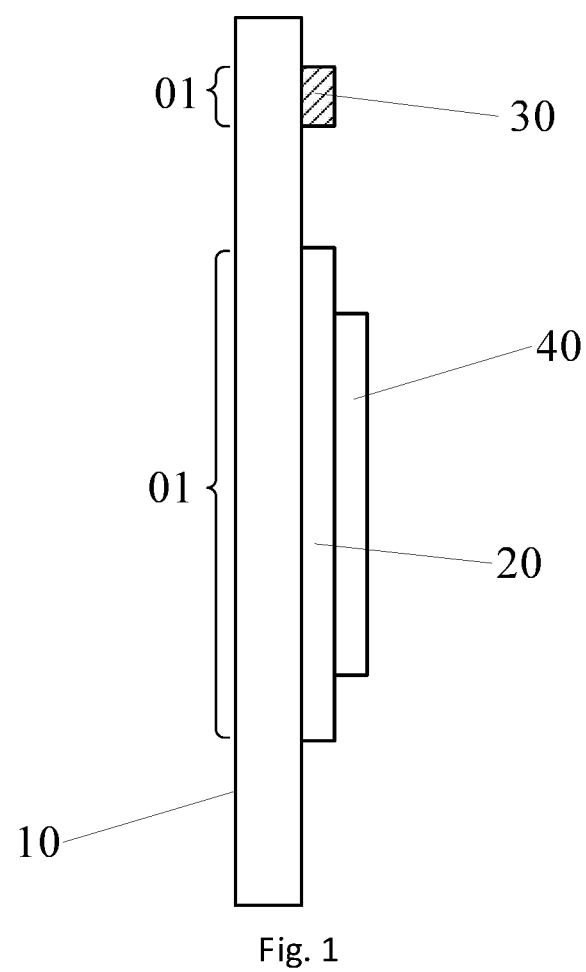
FIG. 1 illustrates a side view of a mirror of an embodiment of the present disclosure.

FIG. 1 illustrates a side view of a mirror of an embodiment of the present disclosure. Referring to FIG. 1, the mirror includes a mirror surface 10 and a display device 20 disposed behind the mirror surface 10. The mirror also includes a imaging and distance measuring device 30 and a processor 40. The imaging and distance measuring device 30 and the processor 40 may be located on the back surface of the mirror or elsewhere on the mirror, such as on the sides or bottom and so on. The mirror surface 10 may include a transflective area 01, and the display device 20 is disposed in the transflective area 01. The imaging and distance measuring device 30 may be provided in the transflective area 01 or other positions where imaging and distance measuring are possible. The processor 40 is separately connected to the display device 20 and the imaging and distance measuring device 30.

Figure 2:
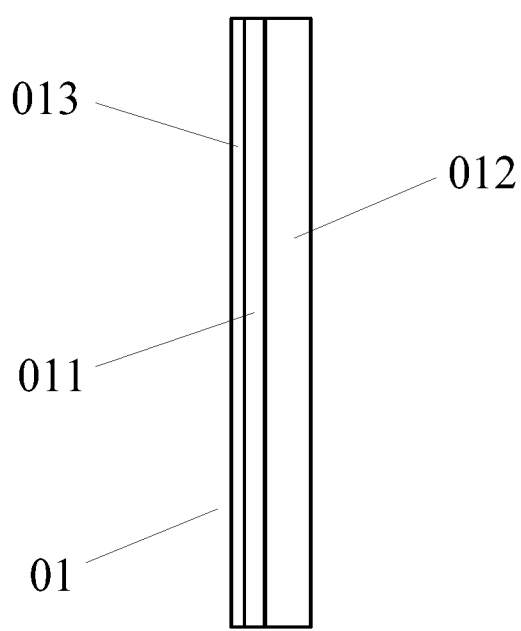
FIG. 2 illustrates a cross-sectional view of a transflective area of an embodiment of the present disclosure.

In particular, FIG. 2 illustrates a cross-sectional view of a transflective area of an embodiment of the present disclosure. Referring to FIG. 2, the transflective area 01 may include a first transflective film layer 011 and a first transparent substrate 012 that are disposed in a stacked manner. The surface of the first transparent substrate 012 away from the first transflective film layer 011 is a portion of the back surface of the mirror surface 10, that is, the transflective area 01 of the mirror surface 10 has a certain degree of light transmittance. Accordingly, when the display device displays an image, the image may be presented through the transflective area 01 of the mirror surface 10, so that a user may view the image displayed by the display device 20 from the front of the mirror surface 10. The imaging and distance measuring device 30 may perform imaging and distance measuring through the transflective area 01 of the mirror surface 10. In an alternative embodiment, the transflective area 01 may include at least two separate transflective sub-areas, and the display device 20 and the imaging and distance measuring device 30 may be respectively disposed in different transflective sub-areas, which is not specifically limited in this embodiment of the disclosure. Moreover, the first transflective film layer 011 of the transflective area 01 also has reflective performance. Therefore, when the display device 20 does not display an image, the transflective area 01 can perform reflective imaging on a user, thereby implementing an imaging function of a general mirror. In addition, as described above, the imaging and distance measuring device 30 may be provided with other positions capable of imaging and distance measuring.

Alternatively, the reflectivity of the first transflective film layer 011 can be greater than or equal to 60% and less than or equal to 80%. For example, in a specific embodiment, the reflectivity of the first transflective film layer 011 can be 70% and the transmittance thereof can be 30%, or the reflectivity of the first transflective film layer 011 can be 65% and the transmittance thereof can be 35%, which is not particularly limited in the embodiment of the present disclosure.

Optionally, in practical applications, the material of the first transflective film layer 011 may be an aluminum material, and certainly, and the material of the first transflective film layer 011 may be other materials that can be used to prepare the transflective film, such as $SiO_2$, $TiO_2$, and the like, which is not specifically limited in this embodiment of the disclosure.

In addition, referring to FIG. 2, in a specific application, the transflective area 01 may further include a first protection layer 013, the first protection layer 013 may be disposed on a surface of the first transflective film layer 011 away from the first transparent substrate 012, and the first protection layer 013 may be used to protect the first transflective film layer 011 on the front surface of the mirror surface 10 from being scratched by an object. In addition, the first protection layer 013 can also enhance the strength of the mirror surface 10, making the mirror surface 10 less prone to breaking. Alternatively, the first protection layer 013 can specifically include stacked $LiO_2$ film layer and $SiO_2$ film layer. The $LiO_2$ film layer is arranged close to the first transflective film layer 011, or the $SiO_2$ film layer is arranged close to the first transflective film layer 011.

Figure 3:
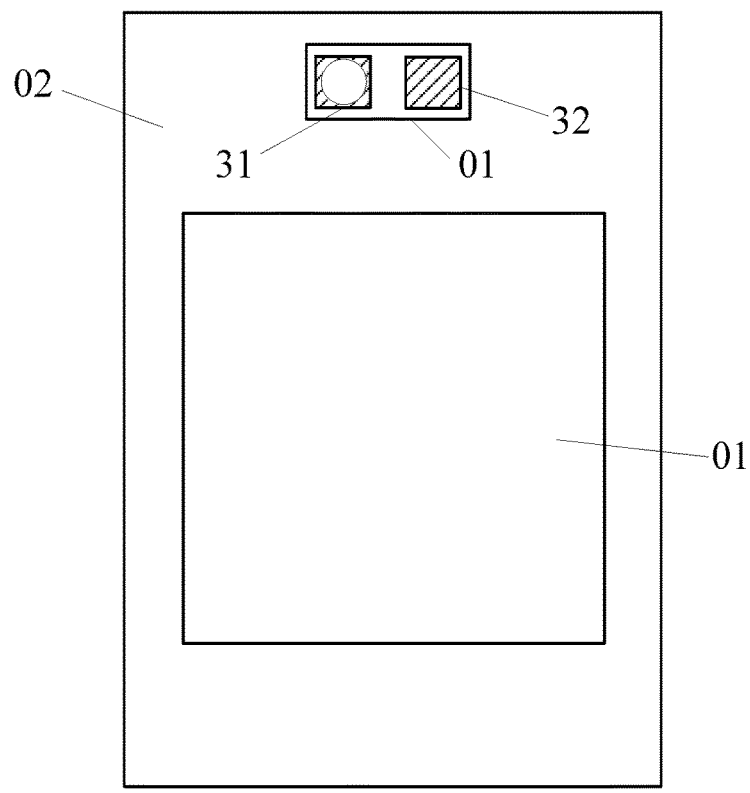
FIG. 3 illustrates a front view of a mirror of an embodiment of the present disclosure.
Figure 4:
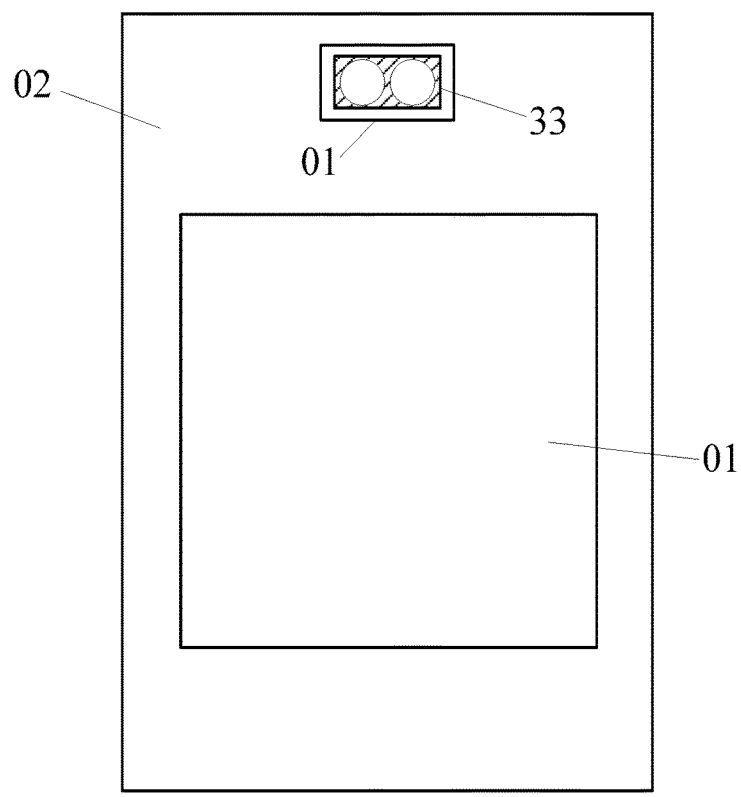
FIG. 4 illustrates a front view of another mirror of an embodiment of the present disclosure.
Figure 5:
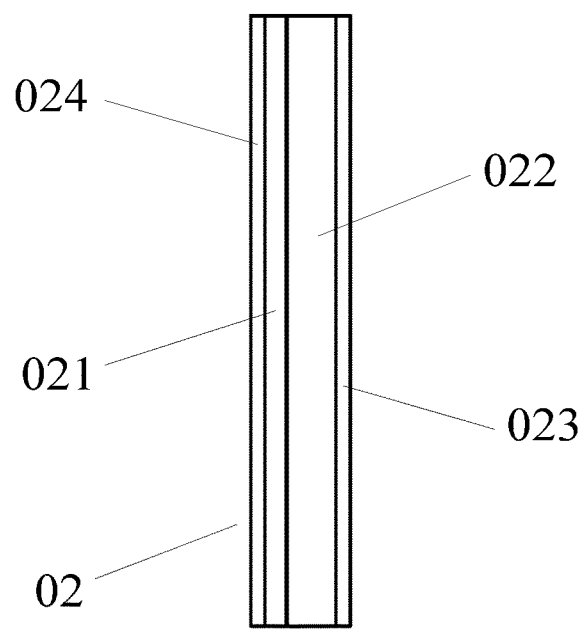
FIG. 5 illustrates a cross-sectional view of a light blocking area of an embodiment of the present disclosure.

Further, FIG. 3 shows a front view of a mirror of the disclosed embodiment, and FIG. 4 shows a front view of another mirror of the disclosed embodiment. Referring to FIGS. 3 and 4, the mirror surface 10 further includes a light blocking area 02. FIG. 5 illustrates a cross-sectional view of one light blocking area of an embodiment of the present disclosure. Referring to FIG. 5, the light blocking area 02 may include a second transflective film layer 021, a second transparent substrate 022, and a light blocking layer 023, which are stacked on each other. The surface of the light blocking layer 023 away from the second transparent substrate 022 is a part of the back surface of the mirror surface 10. The light blocking layer 023 may block light incident from the back surface of the mirror surface 10 to prevent a user from observing devices such as the imaging and distance measuring device 30 from the front of the mirror surface 10, thereby improving the aesthetic appearance. In addition, since the light blocking area 02 includes the second transflective film layer 021 having a reflective property, the light blocking area 02 of the mirror surface 10 can perform reflective imaging on a user, thereby implementing an imaging function of a general mirror.

Optionally, the reflectivity of the second transflective film layer 021 can be greater than or equal to 60% and less than or equal to 80%. For example, in a specific application, the reflectivity of the second transflective film layer 021 may be 70% and the transmittance may be 30%, or the reflectivity of the second transflective film layer 021 may be 65% and the transmittance may be 35%, which is not specifically limited in this embodiment of the present disclosure.

Optionally, in practical applications, the material of the second transflective film layer 021 may be an aluminum material, and certainly, or may be other materials that can be used to prepare the transflective film, such as $SiO_2$, $TiO_2$, and the like, which is not specifically limited in this embodiment of the disclosure.

Optionally, the material of the light blocking layer 023 may be light blocking ink, and the light blocking layer 023 may be formed by a process such as silk-screen printing, which is not specifically limited in this disclosure.

In addition, referring to FIG. 5, in a specific application, the light blocking area 02 may further include a second protective layer 024, and the second protective layer 024 may be disposed on a surface of the second transflective film layer 021 away from the second transparent substrate 022. The second protective layer 024 can be used to protect the second transflective film layer 021 on the front surface of the mirror surface 10 from being scratched by an object. In addition, the second protective layer 024 can also enhance the strength of the mirror surface 10, making the mirror surface 10 less susceptible to breaking. Alternatively, the second protective layer 024 may specifically include a $LiO_2$ film layer and a $SiO_2$ film layer, which are stacked on each other. The $LiO_2$ film is disposed near the second transflective film layer 021, or the $SiO_2$ film is disposed near the second transflective film layer 021.

In practical applications, the second transflective film layer 021 and the first transflective film layer 011 can be integrally formed. The second protective layer 024 and the first protection layer 013 may be integrally formed. In addition, the second transparent substrate 022 and the first transparent substrate 012 can be integrally formed.

Further, the imaging and distance measuring device 30 may be configured to acquire a first user image stream and detect a distance between the user and the mirror. The imaging and distance measuring device 30 outputs the first user image stream and the distance to the processor 40. Specifically, in an alternative embodiment, referring to FIG. 3, the imaging and distance measuring device 30 may include a camera 31 and a distance measuring module 32. In one embodiment, the camera 31 may be a monocular camera, and in another embodiment, the camera 31 may also be a binocular camera or the like. The camera 31 may be configured to acquire a first user image stream, and the distance measuring module 32 may specifically be an infrared distance measuring module, and may be configured to detect a distance between the user and the mirror surface based on a Time of Flight (TOF) principle or an angle distance measuring principle, that is, the imaging and distance measuring device 30 may acquire the image stream through the camera 31 and perform distance measuring through the distance measuring module 32. Further, the imaging and distance measuring device 30 may output the first user image stream and the distance between the user and the mirror to the processor 40.

Alternatively, in another optional embodiment, referring to FIG. 4, the imaging and distance measuring device 30 may include a binocular camera 33, where the binocular camera 33 may implement both imaging of the image stream and distance measurement based on a binocular distance measuring principle. For the process through which the binocular camera achieves distance measuring based on the binocular distance measuring principle, the person skilled in the art can refer to the prior art, details thereof are not repeated herein.

The processor 40 may be configured to determine the position coordinates of the target position at which the user is gazing in a preset coordinate system based on the first user image stream and the distance between the user and the mirror surface. The preset coordinate system is located in association with the body of the user. The preset coordinate system will be further described below. Thereafter, the processor 40 zooms in the first user image stream with the position corresponding to the position coordinates in the first user image stream as the center, obtains a second user image stream, and outputs the second user image stream to the display device 20. The location corresponding to the position coordinate in the first user image stream refers to an image of the target location at which the user is gazing in the first user image stream. In practical applications, the processor 40 may be a hardware module having a processing function, such as an SOC (System on Chip) board, and the embodiment of the present disclosure does not have specific limitations on this.

In a specific application, the processor 40 may be specifically configured to extract a first image of the user looking straight at the mirror surface and a second image in which the user is gazing at the target position from the first user image stream, and determine the position coordinates of the target position in the preset coordinate system according to the first image, the second image and the distance between the user and the mirror surface. That is, the processor 40 may specifically determine the position coordinates of the target position at which the user is gazing in the preset coordinate system by performing the above steps.

The processor 40, upon receiving the first user image stream and the distance input by the imaging and distance measuring device 30, may identify each user image included in the first user image stream, thereby identifying a first image of the user looking straight at the mirror surface 10 during a first preset duration, and a second image of the user gazing at a certain target position during a second preset duration, and extract the first image and the second image. When the processor 40 identifies that the user continues to look straight at the mirror surface 10 for the first preset time period, anyone of the images may be extracted from the first user image stream within the first preset time period as the first image. When the processor 40 identifies that the user continues to gaze at the target location for a second predetermined period of time, any one of the images may be extracted from the second user image stream for the second predetermined period of time as a second image. It should be noted that the case where the user looks straight at the mirror surface in the embodiment of the present disclosure refers to a case where the sight line of the user is perpendicular to the mirror surface in a condition where the user stands parallel to the mirror surface.

Further, the processor 40 may obtain the position coordinates of the target position in the preset coordinate system through conversion by a preset formula based on the first image, the second image and the distance between the user and the mirror surface. The preset coordinate system may use a central position of a center of a pupil of both eyes of the user as an origin, use a preset horizontal direction as a horizontal axis, and use a preset vertical direction as a vertical axis. In practical applications, the preset vertical direction may be a direction from head to foot or from foot to head of the user, and the preset horizontal direction is a direction perpendicular to the preset vertical direction and parallel to the surface of the mirror. The processor 40 may then zoom in the first user image stream by a preset magnification factor, ora magnification factor corresponding to a distance between the user and the mirror or a user instruction, with a position corresponding to the position coordinate in the first user image stream as the center, to obtain a second user image stream, which may be output to the display device 20 for display.

The display device 20 may be configured to display at least a portion of a central region of the second user image stream, and the central region is centered on a location corresponding to the position coordinates of the target location in the second user image stream. Specifically, the display device 20 may display at least a portion of the central region of the second user image stream upon receiving the second user image stream input by the processor 40. The center of at least part of the central area is the position corresponding to the position coordinate of the target position at which the user is gazing in the second user image stream, namely the image of the target position at which the user is gazing in the second user image stream. Thus, the user can observe the zoomed-in image stream of the target position at the center of the display area.

Further, after the display device 20 displays the zoomed in the second user image stream, the mirror may also zoom out or continue to zoom in the second user image stream as desired by the user. The mirror may determine whether it is required to zoom out or continue to zoom in the second user image stream by detecting a user instruction. Specifically, the user may instruct the mirror by action or voice. The user's actions include, for example, a user's hand actions (e.g., gestures), a user's limb actions (e.g., shaking head, waving hand), a user's facial actions (e.g., expressions), and the like.

Figure 6:
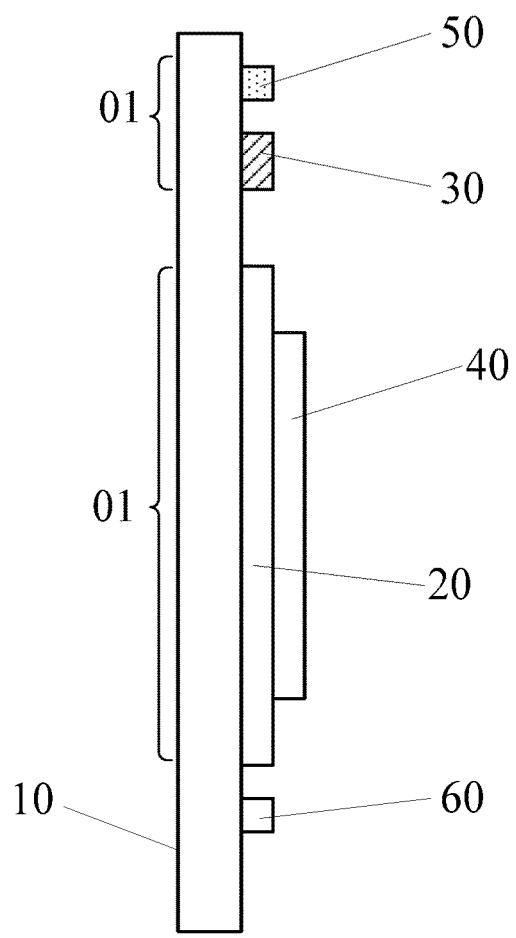
FIG. 6 illustrates a side view of another mirror of an embodiment of the present disclosure.

In one embodiment, referring to FIG. 6, the mirror may further include an action recognition device 50, and the action recognition device 50 may be disposed in the transflective area 01 at the rear of the mirror surface 10. Wherein the action recognition device 50 may be configured to identify a user action instruction, and output the user action instruction to the processor 40. Accordingly, the processor 40 may be further configured to zoom in or zoom out the second user image stream according to the user action instruction, with the position corresponding to the position coordinate in the second user image stream as the center, and output the zoomed-in or zoomed-out second user image stream to the display device 20. The display device 20 may also be configured to display the second user image stream after zooming in or zooming out.

That is, the mirror may identify the user action instruction by the action recognition device 50, and then zoom in or zoom out the second user image stream according to the user action instruction, with the position corresponding to the position coordinate in the second user image stream as the center, and further display the zoomed-in or zoomed-out second user image stream by the display device 20.

In another embodiment, referring to FIG. 6, the mirror may also include a voice recognition device 60. Alternatively, the voice recognition device 60 can be arranged in a light blocking area 02 on the rear side of the mirror surface 10. The voice recognition device 60 may be configured to identify a user voice instruction and output the user voice instruction to the processor 40. Accordingly, the processor 40 may be further configured to zoom in or zoom out the second user image stream according to a user voice instruction, with a position corresponding to the position coordinates in the second user image stream as the center, and output the zoomed-in or zoomed-out second user image stream to the display device 20. The display device 20 may also be configured to display the second user image stream after zooming in or zooming out. In practical applications, the voice recognition device 60 may include a microphone or a microphone array, so that the user voice can be obtained through the microphone or the microphone array, and the user voice instruction corresponding to the user voice is identified.

That is, the mirror may identify the user voice instruction through the voice recognition device 60, and then zoom in or zoom out the second user image stream according to the user voice instruction through the processor 40, with the position corresponding to the position coordinates in the second user image stream as the center, and further display the zoomed-in or zoomed-out second user image stream by the display device 20.

Further alternatively, the display device 20 may include a touch panel in addition to the display panel, so that the user may directly give an instruction to zoom in or zoom out the second user image stream through the touch panel, or other instructions. For example, the mirror may zoom in the second user image stream as the user's two fingers move farther apart on the touch panel, and the mirror may zoom out the second user image stream as the user's two fingers move closer together on the touch panel.

Still further optionally, the mirror may further comprise a speaker, such that the mirror may have voice interaction with the user via the microphone or microphone array and the speaker, to provide image stream related instruction or instruction of use to the user. Of course, in practical applications, the mirror may also explain to or guide the user by means of an illustration and the like, which is not specifically limited in the embodiment of the present disclosure.

In the embodiment of the disclosure, the mirror may acquire the first user image stream by a imaging and distance measuring device disposed in the transflective area of the mirror surface, and detect a distance between the user and the mirror surface. Then, the position coordinates of the target position at which the user is gazing in the preset coordinate system can be determined according to the first user image stream and the distance through a processor which is arranged on the back surface of the mirror surface and connected with the imaging and distance measuring device. Further, the first user image stream is zoomed-in with a position corresponding to the position coordinates in the first user image stream as the center, and a second user image stream is obtained. The mirror may then display at least a portion of a central region of the second user image stream via a display device disposed in the transflective area of the mirror and coupled to the processor. The central region is centered on a location corresponding to the position coordinates in the second user image stream. In the disclosed embodiment, the mirror may determine position coordinates of a target position at which the user is gazing, and zoom in the image stream containing the target position, and may further display the region of the image stream centered on the target position. Thus, the user can observe the zoomed-in target position from the mirror without approaching the mirror, thereby observing the details of the target position. Therefore, convenience of a user in looking into the mirror is improved.

Figure 7:
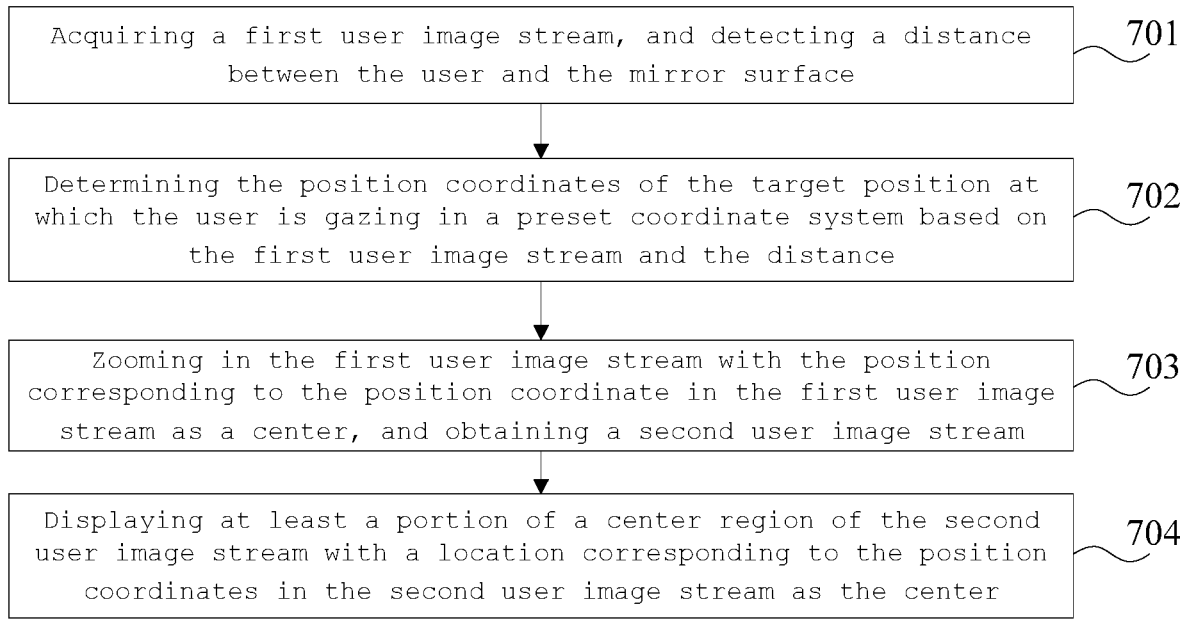
FIG. 7 illustrates a flow chart of steps of a display method of an embodiment of the present disclosure.

FIG. 7 illustrates a flow chart of steps of a display method of an embodiment of the present disclosure. The display method may be applied to the above-described mirror. Referring to FIG. 7, the display method may include the steps of:

step 701, acquiring a first user image stream, and detecting a distance between the user and the mirror surface.

In the disclosed embodiments, the mirror may be used as a vanity mirror and a dressing mirror of the user and so on. The mirror may interact with the user by voice or by graphics and so on to instruct or guide the user. For example, a mirror may instruct a user to place the mirror perpendicular to the ground so that the mirror surface is perpendicular to the ground. In addition, the mirror can guide a user to stand parallel to the mirror surface of the mirror, preferably without wearing sunglasses and the like, so that better detection effect and recognition effect can be achieved in the process of executing the display method provided by the embodiment of the disclosure.

In an alternative embodiment, the mirror may detect the distance between the user and the mirror surface in real time by a imaging and distance measuring device. When the distance is smaller than or equal to the preset distance, the user can be considered to be positioned in front of the mirror at the moment, and needs to check the image of the user through the mirror. At this time, the mirror may acquire a first user image stream by the imaging and distance measuring device, wherein the first user image stream includes a plurality of user images. Of course, in practical applications, the mirror may also acquire the first user image stream in real time through the imaging and distance measuring device, and detect the distance between the user and the mirror surface in real time. Alternatively, the mirror can be triggered by a user through a touch instruction or a voice instruction to acquire a first user image stream, and to detect the distance between the user and the mirror surface. The embodiments of the present disclosure do not specifically limit the trigger timing at which the mirror acquires the first user image stream and detects the distance, and do not specifically limit the execution sequence of acquiring the first user image stream and detecting the distance between the user and the mirror surface.

Step 702, determining the position coordinates of the target position at which the user is gazing in a preset coordinate system based on the first user image stream and the distance.

In the embodiment of the present disclosure, the step may be specifically implemented in the following manner including: extracting a first image of a user looking straight at the mirror surface and a second image of the user gazing at the target position from the first user image stream; and determining the position coordinates of the target position in a preset coordinate system based on the first image, the second image and the distance.

In this step, the mirror may perform image analysis on the first user image stream through the processor based on computer vision technologies such as target recognition and feature point detection, so as to identify pupil centers (or iris centers, because the iris centers coincide with the pupil centers) of both eyes of the user in each user image, so as to track the sight line of the user.

Specifically, the mirror may identify, via the processor, each user image included in the first user image stream to identify a first image of the user looking straight at the mirror surface for a first predetermined duration and a second image of the user gazing at a target location for a second predetermined duration, and extract the first image and the second image. When the mirror identifies that the user continues to watch the mirror surface for a first preset time period, any one image can be extracted from a first user image stream within the first preset time period to serve as a first image. When the mirror identifies that the user continuously gazes at the target position for the second preset time period, any image can be extracted from the first user image stream within the second preset time period as a second image. It should be noted that the case where the user looks straight at the mirror surface in the embodiment of the present disclosure refers to a case where the user looks perpendicular to the mirror surface in a condition where the user stands parallel to the mirror surface.

Further, the step of determining the position coordinates of the target position in the preset coordinate system based on the first image, the second image and the distance between the user and the mirror surface may be specifically implemented by the following sub-steps, including:

sub-step (I), identifying a first center of the left-eye pupil and a first center of the right-eye pupil in the first image;

sub-step (ii), identifying a second center of the left-eye pupil or a second center of the right-eye pupil in the second image;

sub-step (III), determining a position abscissa of the target position in a preset coordinate system based on the first angle, the distance between the first center of the left-eye pupil and the first center of the right-eye pupil in the preset horizontal direction and the distance; and sub-step (IV), determining the position ordinate of the target position in a preset coordinate system based on the second angle and the distance.

The origin of the preset coordinate system is the central position between the first center of the left-eye pupil and the first center of the right-eye pupil; the first angle is a deflection angle between the first center of the left-eye pupil and the second center of the left-eye pupil in a preset horizontal direction, or a deflection angle between the first center of the right-eye pupil and the second center of the right-eye pupil in a preset horizontal direction; the second angle is a deflection angle between the first center of the left-eye pupil and the second center of the left-eye pupil in the preset vertical direction, or a deflection angle between the first center of the right-eye pupil and the second center of the right-eye pupil in the preset vertical direction; the preset vertical direction is perpendicular to the preset horizontal direction, and the preset horizontal direction is parallel to the surface of the mirror.

Specifically, in an optional embodiment, in a case that the first angle is a deflection angle between a first center of the left-eye pupil and a second center of the left-eye pupil in the preset horizontal direction, the sub-step (III) may specifically include:

determining a position abscissa of the target position in a preset coordinate system based on the first angle, a distance between a first center of the left-eye pupil and a first center of the right-eye pupil in a preset horizontal direction, and a distance between the user and the mirror surface by the following formula (1):

$$x = 2d \cdot \tan \theta_1 - p/2 \quad (1)$$

x represents the position abscissa, d represents the distance between the user and the mirror surface, $\theta_1$ represents the first angle, and p represents the distance between the first center of the left-eye pupil and the first center of the right-eye pupil in the preset horizontal direction.

Figure 8:
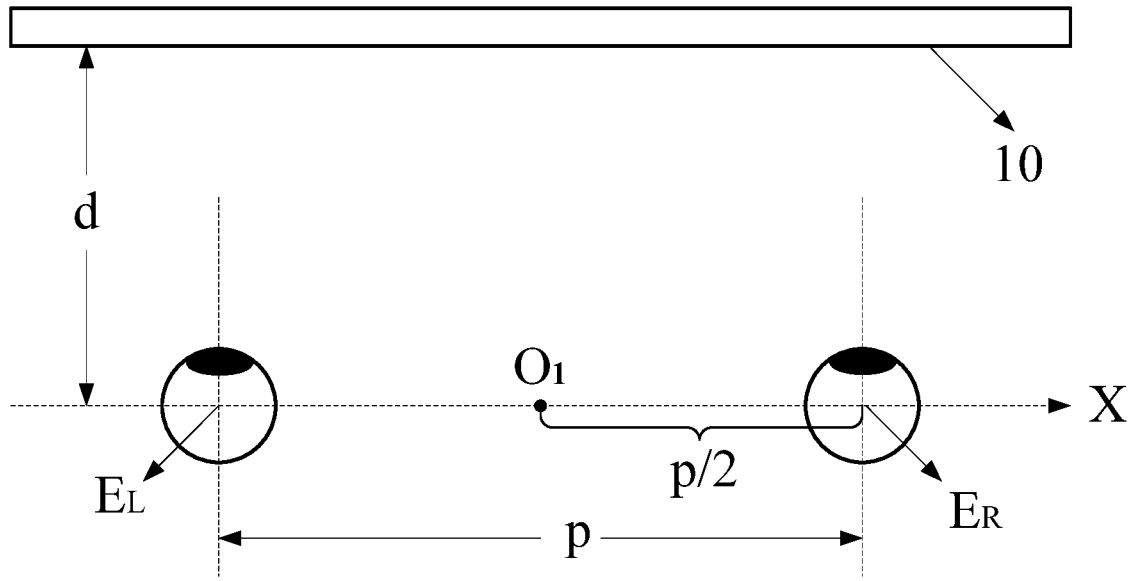
FIG. 8 illustrates a schematic diagram of a user looking straight at a mirror surface of an embodiment of the present disclosure.

FIG. 8 shows a schematic diagram of a user looking straight at a mirror plane in an embodiment of the disclosure. Referring to FIG. 8, a central position between the first center of the left-eye pupil and the first center of the right-eye pupil is an origin of the preset coordinate system. It should be noted that, in practical applications, since the distance between the center of the pupil of the human eye and the center of the eyeball of the human eye is small compared with the distance between the user and the mirror surface, the center position between the first center of the left pupil and the first center of the right pupil can also be considered as the center position between the two eyeball centers. It is to be understood that in FIG. 8 and the subsequent figures relating to the human eye, the dimensions of the human eye are exaggerated in order to show the principle of determining the position coordinates. In practical applications, the distance between the center of the pupil of the human eye and the center of the eyeball of the human eye is actually very small. For the above reasons, in FIG. 8 and the following drawings relating to the human eyes, the center position between the eyeballs of both eyes may be set as the origin $O_1$ of the preset coordinate system. Accordingly, the distance between origin $O_1$ and the first center of the left-eye pupil and the distance between origin $O_1$ and the first center of the right-eye pupil may each be considered to be approximately half of the binocular pupil distance p, i.e., p/2. The distance between the user and the mirror surface 10, i.e. the distance between the user and the front of the mirror surface 10, is d.

Figure 9:
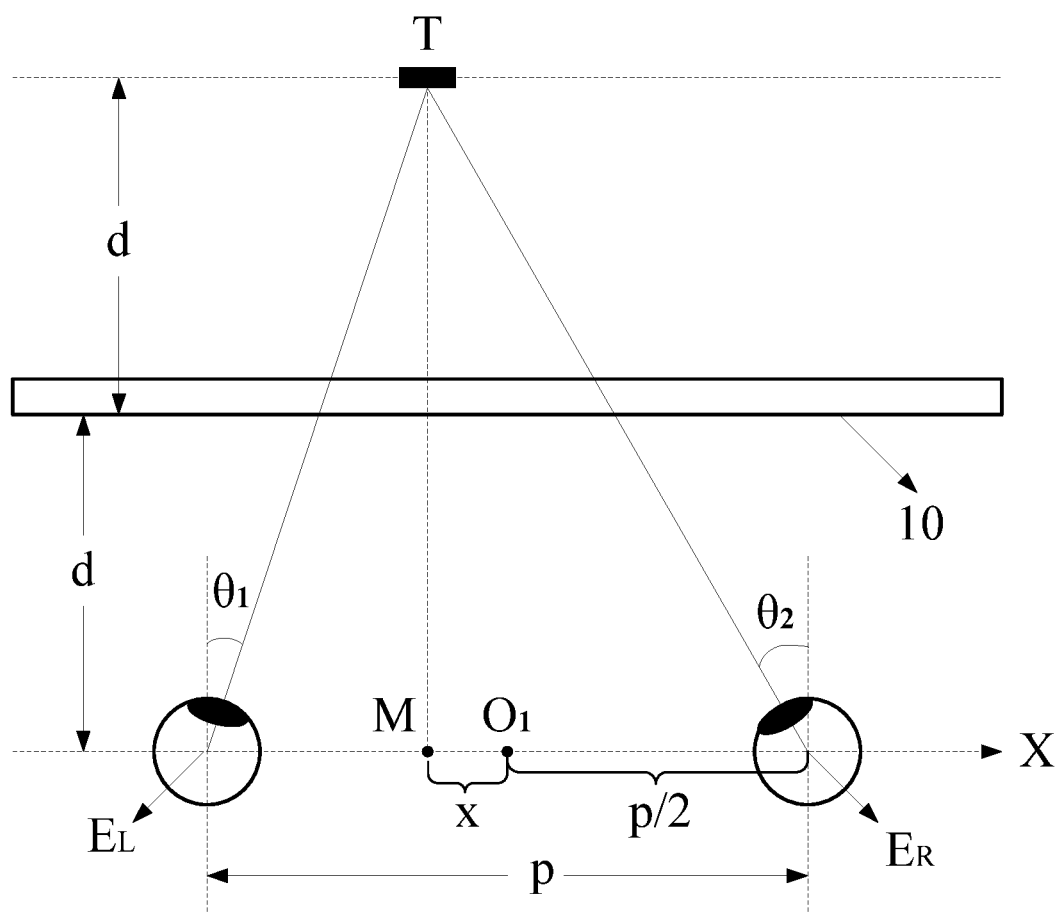
FIG. 9 illustrates a schematic diagram of determining a position abscissa of a target position of an embodiment of the present disclosure.

FIG. 9 illustrates a schematic diagram of determining a position abscissa of a target position according to an embodiment of the disclosure. Referring to FIG. 9, when the user gazes at the target position T, the sight lines of both eyes in the preset horizontal direction X are deflected toward the target position T. For example, as shown in FIG. 9, when the target position T is between two eyes and is deflected to the left eye of the user, the sight line of the left eye of the user may be deflected to the right, the sight line of the right eye of the user may be deflected to the left, and the degree of deflection of the sight line of the left eye of the user may be smaller than that of the sight line of the right eye of the user. At this time, the center of the left-eye pupil of the user is the second center of the left-eye pupil, and the center of the right-eye pupil of the user is the second center of the right-eye pupil. It should be noted that, in practical applications, in order to ensure the accuracy of determining the position coordinates, the mirror may prompt the user to keep the head still and only rotate the eyeball while gazing at the target position via a prompting method such as voice.

In this embodiment, the mirror may determine a position abscissa of the target position in the preset coordinate system based on the second center of the left-eye pupil. Referring to FIG. 9, in the predetermined horizontal direction X, the second center of the left-eye pupil corresponding to the left eye of the user is deflected by a first angle θ1 with respect to the first center of the left-eye pupil corresponding to the left eye of the user when looking straight at the mirror surface 10. It should be noted that the first angle θ1 may have a positive value when the second center of the left-eye pupil is closer to the user's right eye than the first center of the left-eye pupil, and the first angle $\theta_1$ may have a negative value when the second center of the left-eye pupil is further from the user's right eye than the first center of the left-eye pupil.

It should be noted that, in a specific application, the target position may be a mirror image position corresponding to any part on the user. Accordingly, referring to FIG. 9, the image distance between the target position T and the front surface of the mirror surface 10 may be d. As shown in FIG. 9, the orthographic projection position of the target position T in the preset horizontal direction X is M, so the target position T, the first center of the pupil of the lest-eye EL and the orthographic projection position M can form a right triangle $TE_LM$, and the angle $\angle E_LTM$ is equal to the first angle $\theta_1$. Therefore, the mirror can determine the position abscissa x of the target position T in the preset coordinate system based on the trigonometric function according to the above formula (1). For the target position T shown in FIG. 9, the abscissa x of the position of the target position T in the preset coordinate system has a negative value.

In another alternative embodiment, in the case that the first angle is a deflection angle between a first center of the right-eye pupil and a second center of the right-eye pupil in the preset horizontal direction, the sub-step (III) may specifically include:

determining a position abscissa of the target position T in a preset coordinate system based on the first angle, the distance between the first center of the left-eye pupil and the first center of the right-eye pupil in a preset horizontal direction, and the distance between the user and the mirror surface by the following formula (2):

$$x = 2d \cdot \tan \theta_2 + p/2 \quad (2)$$

wherein x represents the position abscissa, d represents the distance between the user and the mirror surface, $\theta_2$ represents a first angle, and p represents the distance between the first center of the left-eye pupil and the first center of the right-eye pupil in the preset horizontal direction.

In this embodiment, the mirror may determine a position abscissa of the target position in the preset coordinate system based on the second center of the right-eye pupil. Referring to FIG. 9, in the preset horizontal direction X, the second center of the right-eye pupil corresponding to the right eye of the user is deflected by a first angle $\theta_2$ with respect to the first center of the right-eye pupil corresponding to the right eye when the user is looking straight at the mirror surface 10. It should be noted that the first angle $\theta_2$ may have a positive value when the second center of the right-eye pupil is farther away from the user's left eye than the first center of the right-eye pupil, and the first angle $\theta_2$ may have a negative value when the second center of the right-eye pupil is closer to the user's left eye than the first center of the right-eye pupil.

As shown in FIG. 9, the orthographic projection position of the target position T in the preset horizontal direction X is M, and thus the target position T, the first center of the right-eye pupil $E_R$ and the orthographic projection position M may form a right triangle $TE_RM$, and the angle $\angle E_RTM$ is equal to the first angle $\theta_2$. Therefore, the mirror can further determine the position abscissa x of the target position T in the preset coordinate system based on the trigonometric function according to the above formula (2). The position abscissa x determined based on the above formulas (1) and (2) is the same.

In addition, the sub-step (IV) may specifically include:
determining a position ordinate of the target position in a preset coordinate system by the following formula (3) based on the second angle and the distance between the user and the mirror surface;

$$y = 2d \tan \beta \quad (3)$$

wherein y represents the position ordinate, d represents the distance between the user and the mirror surface, and d represents the second angle.

Figure 10:
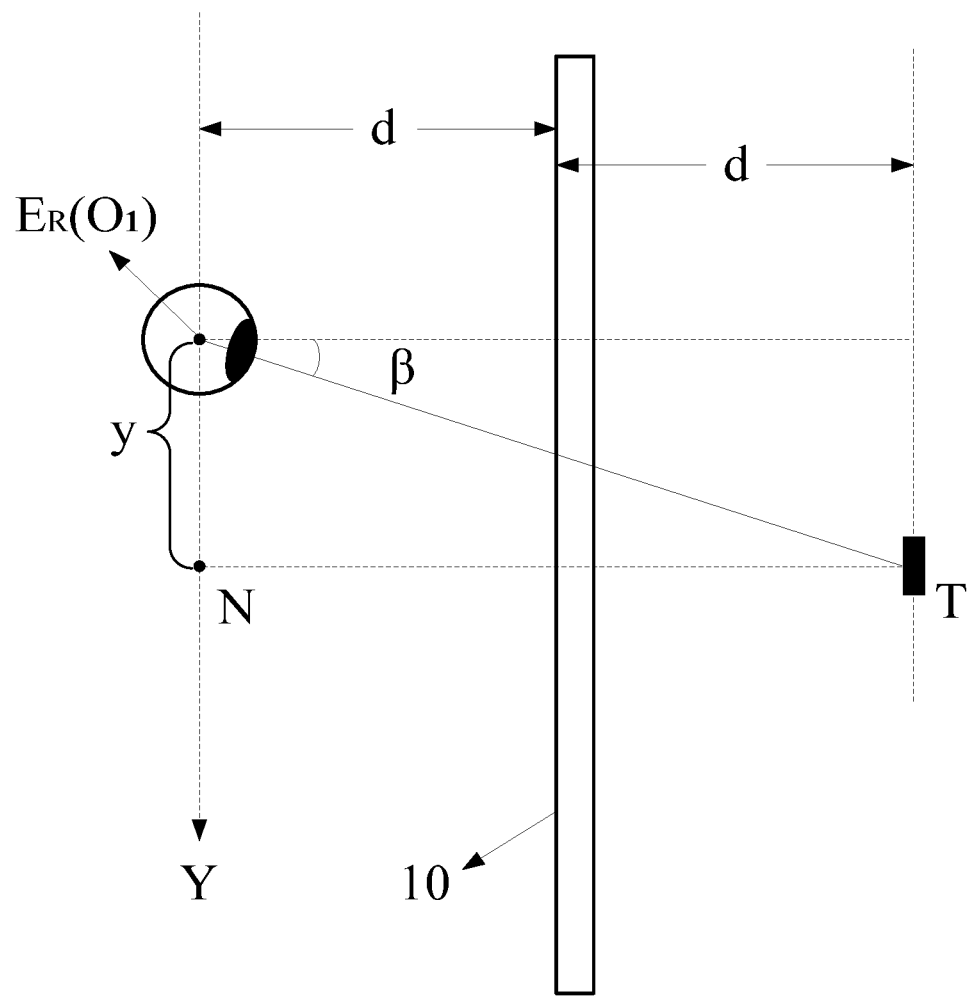
FIG. 10 illustrates a schematic diagram for determining a position ordinate of a target position of an embodiment of the disclosure.

FIG. 10 illustrates a schematic diagram of determining a position ordinate of a target position of an embodiment of the disclosure. Referring to FIG. 10, when the user gazes at the target position T, the sight lines of both eyes are deflected toward the target position T in the preset vertical direction Y. For example, as shown in FIG. 10, when the target position T is located below both eyes, the eyes of the user are deflected downward.

In this embodiment, since both eyes of the user are parallel to the preset horizontal direction X, the mirror may determine the position ordinate of the target position in the preset coordinate system based on either one of the second center of the left-eye pupil and the second center of the right-eye pupil. Taking the second center of the right-eye pupil shown in FIG. 10 as an example, referring to FIG. 10, in the preset vertical direction Y, the second center of the right-eye pupil corresponding to the right eye of the user is deflected by a second angle β with respect to the first center of the right-eye pupil corresponding to the right eye when the user looks at the mirror surface 10. It should be noted that the second angle β may have a positive value when the second center of the right-eye pupil is closer to the user's foot than the first center of the right-eye pupil, that is, the second center of the right-eye pupil is deflected downward. The second angle β may have a negative value when the second center of the right-eye pupil is farther from the user's foot with respect to the first center of the right-eye pupil, that is, the second center of the right-eye pupil is deflected upward.

It should be noted that, in a specific application, the target position may be a mirror image position corresponding to any part on the user. Accordingly, referring to FIG. 10, the image distance between the target position T and the front surface of the mirror surface 10 may be d. As shown in FIG. 10, the orthographic projection position of the target position T in the preset vertical direction Y is N. Thus, the target position T, the first center of the right-eye pupil ER, and the orthographic projection position N may constitute a right triangle $TE_RN$, and the angle ∠ERTN is equal to the second angle β. Therefore, the mirror can determine the position ordinate y of the target position T in the preset coordinate system based on the trigonometric function according to the above formula (3). For the target position T shown in FIG. 10, the position abscissa y of the target position T in the preset coordinate system has a positive value.

It is emphasized that the directional terms such as up, down, left, right and so on in the above description is used based on the directions as shown in the drawings, and that the directional indications will change as the mirror moves.

Step 703, zooming in the first user image stream with the position corresponding to the position coordinate in the first user image stream as a center, and obtaining a second user image stream.

In the embodiment of the present disclosure, this step may be implemented by at least one of the following embodiments, including:

the first embodiment: determining a magnification factor based on the distance between the user and the mirror surface; and zooming in the first user image stream according to the magnification factor, with the position corresponding to the position coordinate in the first user image stream as a center, to obtain a second user image stream.

the second embodiment: zooming in the first user image stream according to a preset magnification factor, with the position corresponding to the position coordinate in the first user image stream as a center, to obtain a second user image stream.

the third embodiment: acquiring a user instruction; determining the magnification factor corresponding to the user instruction; and zooming in the first user image stream according to the magnification factor, with the position corresponding to the position coordinate in the first user image stream as a center, to obtain a second user image stream.

The mirror can determine the required magnification factor based on the distance between the user and the mirror surface. Optionally, a table of distances and corresponding magnifications factors may be stored in the processor of the mirror, where the distances may be in direct proportion to the magnifications factors, that is, the larger the distance between the user and the mirror surface is, the larger the corresponding magnification factor is. This is not specifically limited by the embodiment of the present disclosure. The mirror may zoom in the first user image stream according with a magnification factor corresponding to the distance, with a position corresponding to the position coordinates in the first user image stream as the center, to obtain the second user image stream.

Alternatively, a magnification factor, such as 1.5 times, 2 times, etc., may be preset in the processor of the mirror, so that the processor may zoom in the first user image stream according to the preset magnification factor to obtain the second user image stream.

Still alternatively, the mirror may further comprise some devices for acquiring user instructions, such as action recognition device, voice recognition device, etc., so that the corresponding user instructions can be determined according to the user action and/or the user voice, and then the magnification factor corresponding to the user instructions can be determined. The mirror may zoom in the first user image stream according to a magnification factor corresponding to the user instruction, with a position corresponding to the position coordinate in the first user image stream as the center, to obtain the second user image stream.

Step 704, displaying at least a portion of a center region of the second user image stream with a location corresponding to the position coordinates in the second user image stream as the center.

In this step, the mirror may display, via the display device, a central region of at least part of the second user image stream, the central region being centered on a position corresponding to the position coordinates of the target position in the second user image stream at which the user is gazing, so that the user may view an zoomed-in image stream of the target position at the center of the display region.

Further, after the mirror displays the zoomed-in image stream of the second user, the mirror may also zoom out or continue to zoom in the image stream of second user as desired by the user. The mirror may determine whether zooming in or zooming out of the second user image stream is required by detecting a user instruction. Specifically, the user may instruct the mirror by action or voice.

Accordingly, in an alternative embodiment, step 704 may be followed by the following steps: identifying a user action instruction; zooming in or zooming out the second user image stream according to the user action instruction with the position corresponding to the position coordinate in the second user image stream as the center; displaying the second user image stream after zooming in or zooming out.

In a specific application, the mirror can identify a user action instruction through the action identification device, then zooms or zooms out the second user image stream according to the user action instruction, with a position corresponding to the position coordinate of the target position in the second user image stream as the center through the processor, and display the zoomed in or zoomed out second user image stream through the display device.

In another alternative embodiment, step 704 may be followed by the following steps: identifying a user voice instruction; zooming in or zooming out the second user image stream according to the user voice instruction with the position corresponding to the position coordinate in the second user image stream as the center; displaying the second user image stream after zooming in or zooming out.

In specific application, the mirror can identify a user voice instruction through the voice recognition device, then zoom in or zoom out the second user image stream according to the user voice instruction, with a position corresponding to the position coordinate of the target position in the second user image stream as the center through the processor, and further displays the zoomed-in or zoomed-out second user image stream through the display device.

Further optionally, the display device may include a touch panel in addition to the display panel, so that the user may directly give an instruction to zoom in or zoom out the second user image stream through the touch panel, or other instructions. For example, the mirror may zoom in the second user image stream as the user's two fingers move away from each other on the touch panel, and may zoom out the second user image stream as the user's two fingers move closer to each other on the touch panel.

Still further optionally, the mirror may further comprise a speaker, such that the mirror may have voice interaction with the user via the microphone or microphone array and the speaker in the voice recognition module to provide image stream related instruction or instruction of use to the user. Of course, in practical applications, the mirror may also explain to or guide the user by means of an illustration and the like, which is not specifically limited in the embodiment of the present disclosure.

In addition, the mirror can adjust the focal length of the imaging and distance measuring module based on the distance between the user and the mirror surface detected by the imaging and distance measuring module, so that the face of the user can clearly image, such that the imaging quality is improved, and then the accuracy of determining the position coordinate of the target position can be improved.

Furthermore, the mirror may also activate a rear view function upon user instruction. When it is detected that the user turns his back to the mirror, the mirror can record or image the appearance of the back of the user, and then the user can control the mirror to play back the video or the photo of the appearance of the back through the instruction. Therefore, the user can observe information such as hairstyle and the like on the back of the user without leaning or twisting the head, and convenience of the user when the user looks into the mirror is improved.

In embodiments of the present disclosure, the mirror may acquire a first user image stream and detect a distance between the user and the mirror surface. The mirror may then determine the position coordinates of the target position at which the user is gazing in a preset coordinate system based on the first user image stream and the distance. The mirror may then zoom in the first user image stream with a position corresponding to the position coordinates in the first user image stream as the center to obtain a second user image stream. The mirror may then display at least a portion of the center region of the second user image stream, where the center region is centered on a location corresponding to the position coordinates in the second user image stream. In the disclosed embodiment, the mirror may determine position coordinates of a target position at which the user is gazing, and zoom in an image stream containing a position corresponding to the position coordinates, and may further display the region of the image stream centered on the target position. Therefore, the user can observe the zoomed-in target position from the mirror without approaching the mirror, so that the details of the target position can be observed, and the convenience of the user in looking into the mirror is improved.

It is obvious to those skilled in the art from the above embodiments that the present disclosure can be implemented by software through necessary hardware, or by hardware, firmware, etc. With this understanding in mind, embodiments of the present disclosure may be embodied in part in the form of a computer program product. The computer program product may be stored in a non-transitory computer readable medium such as ROM, Random Access Memory (RAM), floppy disk, hard disk, optical disk, or flash memory. The computer program product comprises a series of instructions which, when executed by a processor, cause the processor to perform the method according to various embodiments of the present disclosure or a portion thereof. The processor may be any kind of processor, and may include, but is not limited to, a general-purpose processor and/or a special-purpose processor (e.g., a digital processor, an analog processor, a digital circuit designed to process information, an analog circuit designed to process information, a state machine, and/or other mechanisms for electronically processing information).

In an exemplary embodiment, it is also provided a non-transitory computer-readable medium having instructions stored thereon, which when executed by a processor, cause the processor to perform a method according to various embodiments of the present disclosure or a portion thereof.

While, for purposes of simplicity of explanation, the foregoing method embodiments have been presented as the combinations of a series of actions, it will be appreciated by those of ordinary skill in the art that the present disclosure is not limited by the order of actions, as some steps may, in accordance with the present disclosure, take place in other orders and/or concurrently. Further, those skilled in the art will appreciate that the embodiments described in the specification are preferred embodiment and that the related actions and modules are not necessary for the present disclosure.

The embodiments in the present specification are all described in a progressive manner, and each embodiment focuses on the differences from other embodiments, and portions that are the same and similar between the embodiments may be referred to each other.

Finally, it should also be noted that, in this disclosure, relational terms such as first and second, and the like are used solely to distinguish one entity or action from another entity or action without necessarily requiring or implying any actual relationship or order between such entities or actions. Also, the terms "comprise", "include" or any other variation thereof, are intended to express a non-exclusive inclusion, such that a process, method, article, or apparatus that comprises a list of elements not only include those elements but also may include other elements not expressly listed or inherent to such process, method, article, or apparatus. Without further limitation, an element defined by the phrase "comprising a/an/one . . . " does not exclude the presence of other identical elements in the process, method, article, or apparatus that comprises the element.

The mirror and the display method provided by the present disclosure are introduced in detail, and specific examples are used herein to explain the principles and embodiments of the present disclosure, and the descriptions of the above embodiments are only used to help understanding the method and the core idea of the present disclosure. Meanwhile, for a person skilled in the art, according to the idea of the present disclosure, there may be variations in the specific embodiments and the application scope, and in summary, the content of the present specification should not be construed as a limitation to the present disclosure.

What is claimed is:

1. A mirror comprises a mirror surface and a display device arranged on a back surface of the mirror surface, and further comprises an imaging and distance measuring device and a processor; the mirror surface comprises a transflective area, and the display device is arranged in the transflective area; the processor is separately connected with the display device and the imaging and distance measuring device;

the imaging and distance measuring device is configured to acquire a first user image stream, detect a distance between a user and the mirror surface, and output the first user image stream and the distance to the processor;

the processor is configured to determine, from the first user image stream and the distance, a position coordinate of a target position at which the user is gazing in a preset coordinate system, the preset coordinate system being located in association with a body of a user, and the processor is further configured to zoom in the first user image stream, with a position corresponding to the position coordinate in the first user image stream as the center, to obtain a second user image stream, and to output the second user image stream to the display device;

the display device is configured to display at least a portion of a central region of the second user image stream; the central region is centered on a location corresponding to the position coordinates in the second user image stream.

2. The mirror according to claim 1, wherein the processor is configured to extract, from the first user image stream, a first image of the user looking straight at the mirror surface and a second image of the user gazing at the target position, and to determine from the first image, the second image and the distance the position coordinate of the target position in the preset coordinate system.

3. The mirror according to claim 1, wherein the transflective area comprises a first transflective film layer and a first transparent substrate arranged in a stack; a surface of the first transparent substrate away from the first transflective film layer is a part of the back surface of the mirror surface.

4. The mirror according to claim 1, wherein the mirror surface further comprises a light blocking area comprising a second transflective film layer, a second transparent substrate, and a light blocking layer, which are disposed in a stack; and the surface of the light blocking layer away from the second transparent substrate is a part of the back surface of the mirror surface.

5. The mirror according to claim 3, wherein a reflectivity of the first transflective film layer is greater than or equal to 60% and less than or equal to 80%.

6. The mirror according to claim 4, wherein a reflectivity of the second transflective film layer is greater than or equal to 60% and less than or equal to 80%.

7. The mirror according to claim 1, wherein the mirror further comprises an action recognition device, the action recognition device being provided in the transflective area on the back surface of the mirror surface;

the action recognition device is configured to identify a user action instruction, and output the user action instruction to the processor;

the processor is further configured to zoom in or zoom out the second user image stream according to the user action instruction, with a position corresponding to the position coordinates in the second user image stream as the center, and output the zoomed-in or zoomed-out second user image stream to the display device;

the display device is further configured to display the second user image stream after zooming in or zooming out.

8. The mirror according to claim 1, wherein the mirror further comprises a voice recognition device configured to identify a user voice instruction, and output the user voice instruction to the processor;

the processor is further configured to zoom in or zoom out the second user image stream according to the user voice instruction, with a position corresponding to the position coordinates in the second user image stream as the center, and output the zoomed-in or zoomed-out second user image stream to the display device;

the display device is further configured to display the second user image stream after zooming in or zooming out.

9. A mirror according to claim 1, wherein the imaging and distance measuring device comprises a camera and a distance measuring module; or the imaging and distance measuring device comprises a binocular camera.

10. A display method applied to a mirror comprising a mirror surface and a display device arranged on a back surface of the mirror surface, the mirror surface comprises a transflective area, and the display device is arranged in the transflective area, the method comprising:

acquiring a first user image stream, and detecting a distance between a user and the mirror surface;

determining, from the first user image stream and the distance, position coordinates of a target position at which the user is gazing in a preset coordinate system, the preset coordinate system being located in association with the user's body;

zooming in the first user image stream with a position corresponding to the position coordinate in the first user image stream as a center, and obtaining a second user image stream; and displaying at least a portion of a central region of the second user image stream, the central region being centered on a location corresponding to the position coordinates in the second user image stream.

11. The method according to claim 10, wherein the determining, from the first user image stream and the distance, position coordinates of the target location at which the user is gazing in a preset coordinate system comprises:

extracting, from the first user image stream, a first image of the user looking straight at the mirror surface and a second image of the user gazing at the target position; and determining the position coordinates of the target position in the preset coordinate system based on the first image, the second image and the distance.

12. The method according to claim 11, wherein the determining position coordinates of the target location in a preset coordinate system based on the first image, the second image, and the distance comprises:

identifying a first center of a left-eye pupil and a first center of a right-eye pupil in the first image;

identifying a second center of the left-eye pupil or a second center of the right-eye pupil in the second image;

determining a position abscissa of the target position in the preset coordinate system based on a first angle, a distance between the first center of the left-eye pupil and the first center of the right-eye pupil in a preset horizontal direction, and the distance, wherein the first angle is a deflection angle between the first center of the left-eye pupil and the second center of the left-eye pupil in the preset horizontal direction, or, a deflection angle between the first center of the right-eye pupil and the second center of the right-eye pupil in the preset horizontal direction; and determining a position ordinate of the target position in the preset coordinate system based on a second angle and the distance, wherein the second angle is a deflection angle between the first center of the left-eye pupil and the second center of the left-eye pupil in a preset vertical direction, or, a deflection angle between the first center of the right-eye pupil and the second center of the right-eye pupil in the preset vertical direction;

wherein an origin of the preset coordinate system is a central position between the first center of the left-eye pupil and the first center of the right-eye pupil; and the preset vertical direction is perpendicular to the preset horizontal direction.

13. The method according to claim 12, wherein the first angle is the deflection angle between the first and second center of the left-eye pupils in the preset horizontal direction;

the determining the position abscissa of the target position in the preset coordinate system based on the first angle, the distance between the first center of the left-eye pupil and the first center of the right-eye pupil in the preset horizontal direction, and the distance, including:

determining the position abscissa of the target position in the preset coordinate system by a following formula (1) based on the first angle, the distance between the first center of the left-eye pupil and the first center of the right-eye pupil in the preset horizontal direction, and the distance:

$$x = 2d \cdot \tan \theta_1 - p/2 \quad (1)$$

wherein x represents the position abscissa, d represents the distance between the user and the mirror surface, $\theta_1$ represents the first angle, and p represents the distance between the first center of the left-eye pupil and the first center of the right-eye pupil in the preset horizontal direction.

14. The method according to claim 12, wherein the first angle is the deflection angle between the first center of the right-eye pupil and the second center of the right-eye pupil in the preset horizontal direction;

the determining a position abscissa of the target position in a preset coordinate system based on the first angle, the distance between the first center of the left-eye pupil and the first center of the right-eye pupil in the preset horizontal direction, and the distance, including:

determining the position abscissa of the target position in a preset coordinate system by a following formula (2) based on the first angle, the distance between the first center of the left-eye pupil and the first center of the right-eye pupil in the preset horizontal direction, and the distance:

$$x = 2d \cdot \tan \theta_2 + p/2 \quad (2)$$

wherein x represents the position abscissa, d represents the distance between the user and the mirror surface, $\theta_2$ represents the first angle, and p represents the distance between the first center of the left-eye pupil and the first center of the right-eye pupil in the preset horizontal direction.

15. The method according to claim 12, wherein the determining a position ordinate of the target position in the preset coordinate system from the second angle and the distance comprises:

determining the position ordinate of the target position in the preset coordinate system based on the second angle and the distance by the following formula (3):

$$y = 2d \tan \beta \quad (3)$$

wherein y represents the position ordinate, d represents the distance between the user and the mirror surface, and d represents the second angle.

16. The method according to claim 10, wherein the zooming in the first user image stream with a position corresponding to the position coordinate in the first user image stream as a center, and obtaining a second user image stream comprises:

determining a magnification factor based on the distance; and zooming in the first user image stream according to the magnification factor, with the position corresponding to the position coordinate in the first user image stream as a center, to obtain a second user image stream.

17. The method according to claim 10, wherein after displaying a central region of the second user image stream, the method further comprises:

identifying a user action instruction or a user voice instruction;

zooming in or zooming out the second user image stream according to the user action instruction or the user voice instruction, with a position corresponding to the position coordinate in the second user image stream as a center; and displaying the second user image stream after being zoomed-in or zoomed-out.

18. A non-transitory computer readable medium having instructions stored thereon, which, when executed by a processor, cause the processor to perform the steps of the method according to claim 10.

* * * * *